3,345,625
PLURAL CHANNEL MONITOR DISPLAYING A.C.
OR D.C. INFORMATION SIGNALS AS A BAR
GRAPH ON AN OSCILLOSCOPE
James E. Russell and William J. Shannahan, Tulsa, Okla.,
assignors to Remote Measurements, Inc., Tulsa, Okla.,
a corporation of Oklahoma
Filed July 3, 1963, Ser. No. 292,624
3 Claims. (Cl. 340—212)

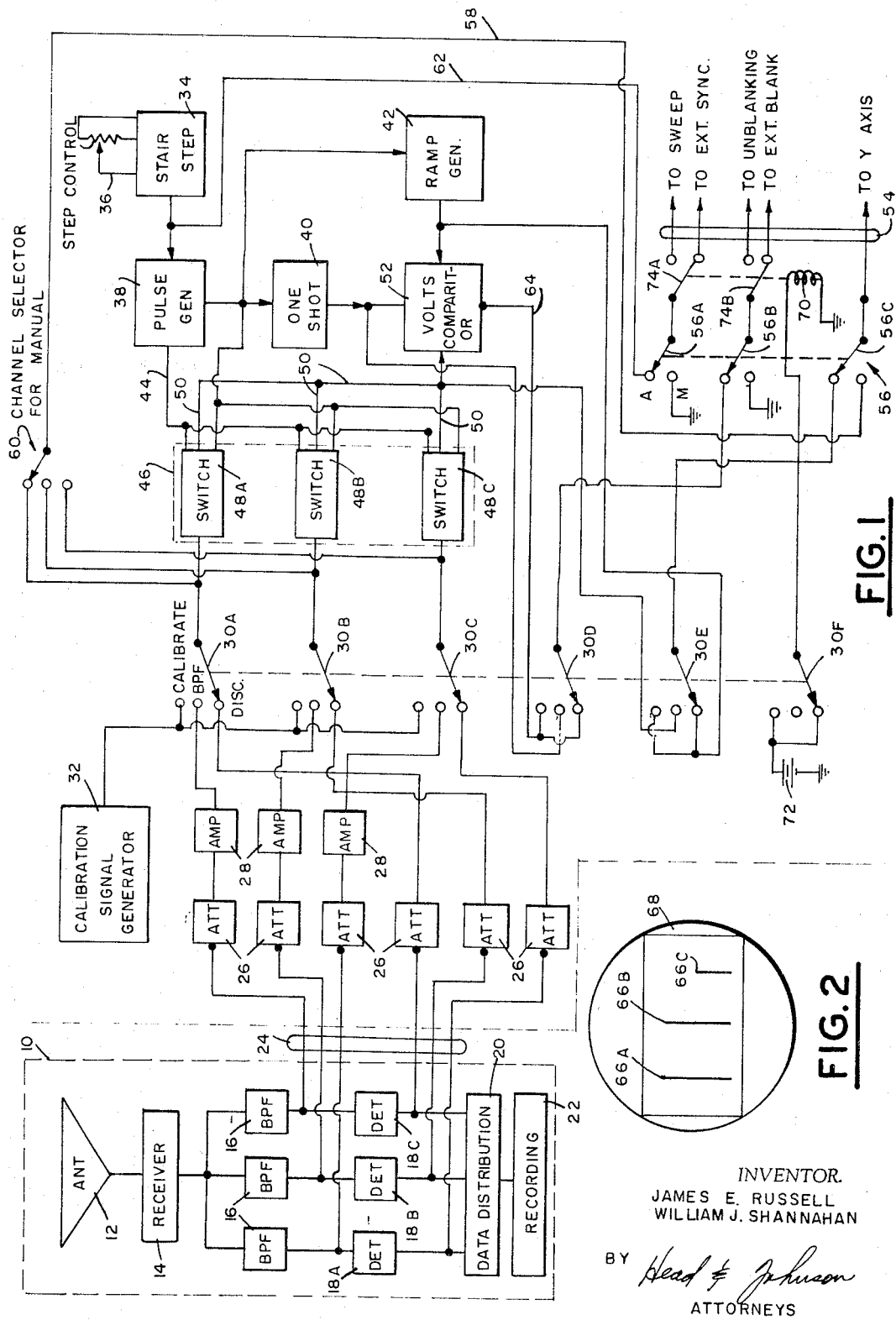
Oct. 3, 1967  J. E. RUSSELL ET AL  3,345,625
PLURAL CHANNEL MONITOR DISPLAYING A.C. OR D.C. INFORMATION
SIGNALS AS A BAR GRAPH ON AN OSCILLOSCOPE
Filed July 3, 1963
INVENTOR.
JAMES E. RUSSELL
WILLIAM J. SHANNAHAN
BY Head & Johnson
ATTORNEYS United States Patent Office 3,345,625
Patented Oct. 3, 1967

ABSTRACT OF THE DISCLOSURE

This invention is a monitor for simultaneously monitoring, on an oscilloscope having a vertical deflection input, a multi-channel telemetry receiver system wherein said system consists of a multiplicity of discriminator channels, each of said channels consisting of a bandpass filter section and a detector section, the monitor comprising a means of time multiplexing a sample of the signal of each discriminator channel by means of an electronic switch, means comparing the obtained signal with a linearly time varying ramp voltage, means of detecting the point of coincidence of each of the signals with the ramp voltage, means of generating a scope beam pattern such that the beam steps horizontally across the scope face and sweeps vertically full scale at each step in the wave form, a circuit unblanking the scope beam during the time interval of the initiation of the vertical sweep to the coincidence of the ramp voltage and the multiplex signal voltage to provide a multiple bar graph display on the scope face.

This invention relates to a discriminator monitor. More particularly, the invention relates to a device for the visual monitoring of a multiplicity of signals by the simultaneous presentation of a unitary bar graph display of the signals. Still more particularly, the invention relates, in one application, to a device for the visual monitoring of an FM/FM telemetry discriminator system including simultaneous monitoring of all channels for immediate determination of system performance.

In various phases of industry today situations exist in which a multiplicity of functions needs to be simultaneously monitored. An example, which will be utilized repeatedly in this description for purposes of illustration and not for purposes of limitation, includes multi-channel FM/FM telemetry discriminator systems. This type of system is uniformly used in missile work for monitoring the functioning of systems on missiles preparatory to flight and while the missile is airborne.

During preparation for the firing of a missile the various channels of information and communication must be continuously checked to make sure that all channels are properly functioning at all times. This is a particularly difficult problem. In telemetry systems frequently the variation in performance of one channel will affect the performance of other channels. Thus, when one channel is recalibrated or brought back into calibration after a malfunction, it is frequently necessary to recalibrate all of the other channels. In addition, to make certain that in any one instant all of a multiplicity of channels, are functioning is an almost impossible task with present equipment. It is therefore an object of this invention to provide a device which will display a graphic analysis of a multiplicity of channels simultaneously.

Another object of this invention is to provide a device for monitoring the AC output of the bandpass filters of a multi-channel FM/FM telemetry discriminator system.

Another object of this invention is to provide a device which will simultaneously monitor the DC or discriminator output of a multiplicity of channels of a FM/FM telemetry discriminator system.

Still another object of this invention is to provide a device which will monitor a multiplicity of signals by the presentation of a bar graph display in a manner to simultaneously indicate the mal-performance of any one of a multiplicity of functions in a system.

These and other objects and a better understanding of the invention may be had by referring to the following description and claims taken in conjunction with the attached drawings in which:

FIGURE 1 is a block diagram of the discriminator monitor of this invention as applied to monitoring a typical FM/FM telemetry discriminator system.

FIGURE 2 is a view of a scope display as provided by the monitor of this invention.

Briefly stated, this invention relates to a monitor for simultaneously monitoring a multiplicity of signals. More particularly, but not by way of limitation, the invention relates to a method of simultaneously monitoring a multiplicity of channels of information comprising the steps of time multiplexing the information through an electronic switch, comparing the obtained signals with a linearly time varying ramp voltage, detecting the point of coincidence of each of said signals with said ramp voltage, generating a scope beam pattern such that the beam steps horizontally across the scope face and sweeps vertically full scale at each step in the wave form, and unblanking the scope beam during the time interval of the initiation of the vertical sweep to the coincidence of the ramp voltage and the multiplex signal voltage to provide a multiple bar graph display.

Referring now to FIGURE 1 an embodiment of the invention is set forth in block diagram form. The invention will be described as it particularly pertains to the application of monitoring an FM/FM telemetry discriminator system of the type most frequently used for monitoring missiles and other remote or airborne systems. A simplified telemetry system is shown in a block diagram enclosed in dotted lines and generally indicated by the numeral 10. The telemetry system 10 is of the type utilized to receive an FM/FM telemetry signal from an airborne system, the signal being received on antenna 12. After the signal is received it passes through a receiver 14 and thence into a multiplicity of bandpass filters 16. The signal received on the antenna 12 is a composite of a multiplicity of information bearing signals. The separate information carrying signals are selected by the individual bandpass filters 16. In this description only three bandpass filters 16 are shown indicating three different channels of information. It is to be understood that the invention functions for any number of such channels. In the typical telemetry system utilized for airborne missiles there is usually eighteen channels of information. In such event, there would be eighteen bandpass filters 16 but the additional fifteen would be a mere repetition of those shown and have therefore been eliminated in this description for purposes of simplicity.

From the bandpass filter 16 the information carrying signals pass through detectors where the information is extracted. The output of the detectors is utilized in a variety of ways such as by passing through a data distribution system 20 and subsequently to recording devices 22.

Each of the bandpass filters 16 and its conjoint detectors 18 together constitute a discriminator which extracts information from the signal output of receiver 14. By monitoring the function of each of the discriminators evaluation of the performance of telemetry system is obtained. Basically, this invention functions to monitor the discriminators of a telemetry system, and is therefore termed a "discriminator monitor."

The discriminator monitor of this invention is connected to a telemetry system 10 by means of a cable 24. Conductors in cable 24 connect to the output of each the bandpass filter 16 and each detector 18. In the monitor the signals from cable 24 are first attenuated by means of individual attenuators 26, which function as individual circuit calibrating means. The output of each of the attenuators 26 receiving a signal from a bandpass filter 16 in the telemetry system is fed through individual amplifying circuits 28. The provision of amplifier circuits 28 is optional as such circuits are required only when the signal to be monitored is insufficient in amplitude to achieve ample deflection of a scope beam as will be later described. When a system is to be monitored wherein the signals received are of sufficient amplitude the amplifier 28 may be eliminated. The output of each amplifier 28 connects to a multiplexed mode selector switch 30. In a similar manner the output of each attenuatory 26 communicating with a detector 18 of the telemetry system 10 is connected to a separate position on the mode selector switch 30.

A calibration signal generator 32 is provided for purposes of calibration as will be described subsequently. The output of this signal generator communicates with positions on the multiplexed selector switch 30.

The discriminator monitor of this invention functions, as has previously been indicated, by sequentially displaying on the screen of a scope an unblanked vertical signal indicative of the individual signals being received by means of cable 24. The invention functions in a synchronized procedure by the effects of the initiation of a voltage wave by stairstep generator 34. Step control circuit means 36 in the stairstep generator 34 provide a method of controlling the stairstep wave signal output of the generator. This output signal is fed to a pulse generator 38. The output of pulse generator feeds a one-shot multivibrator 40 and a ramp generator 42. In addition, a channel signal output on conductor 44 from the pulse generator 38 feeds an electronic switch 46. The switch 46 is preferably of the tumblecounter type providing isolated switching circuits 48A, 48B and 48C. The output of pulse generator 38 on conductor 44 sequentially actuates switches 48A, 48B and 48C to provide communication between the center tap of switches 30A, 30B and 30C with switch output conductors 50 which are connected to a common conductor feeding into a voltage comparator circuit 52.

The output of the discriminator monitor is connected to a typical display scope which is not shown. Connection to the display scope is through cable 54 and automatic-manual switch 56 which varies the type of signals sent to the scope according to the type of test being made. In the upper or automatic position of switch 56 the scope sequentially displays simultaneously the status of signals being received in the output of the multiplicity of discriminator circuits in a telemetry system 10. In the lower or manual position of switch 56 the individual status of separate circuits may be viewed on the scope for testing and information purposes. In the lower position of switch 56 portion 56C by conductor 58 communicates to a channel selector switch 60. The channel selector switch 60 in turn provides selected connection of conductor 58 with the signal received at the center tap of switches 30A, 30B and 30C. With automatic-manual switch 56 in the downward or manual position the internal sweep generating circuits of the scope are utilized and only a signal is sent to the Y axis as selected by the channel selector switch 60. The type of signal communicated to the Y axis is determined by the position of modes selector switch 30. In the upper position the output of calibrator signal generator 32 is fed to the Y axis. In the center position the output of the bandpass filter 16 of one of the bandpass filters 16 in the telemetry system 10, as selected by channel selector switch 60, is fed to the Y axis. This is an AC signal and permits visual observance of the AC signal from any of the bandpass filters in the telemetry system. When the mode selector switch 30 is in the downward position the discriminator signal of the output of one of the detectors 18 in the telemetry system 10 selected by the channel selector switch 60 is subject to visual inspection.

When the automatic-manual switch 56 is in the upper or automatic position the sweep of the scope is controlled through conductor 62 by the output of step generator 34. This sweeps the scope beam in coordination with the step output signal of the stairstep generator 34. Switch 56B, when in the upper or automatic position provides unblanking control to the scope as selected by switch 30D. When mode selector switch 30 is in the downward position the output of the voltage comparator 64 is fed by switch 30D to the unblanking circuit. The output of the voltage comparator 52 is equivalent to the DC voltage of the signal output of the detectors 18. The voltage comparator circuit 52 functions to compare the voltage output of each discriminator as taken from the output of detectors 18 in the telemetry system 10 with a saw tooth or ramp shaped voltage signal output of ramp generator 42. The comparison of the substantially steady state of DC signal voltage detected from each of the discriminators in the telemetry system 10 versus the time varying voltage of the signal generated by the ramp generator 42 provides an unblanking pulse output on conductor 54 of a time duration proportional to the value of the DC signal. This time duration functions as an unblanking signal so that a vertical lighted bar is produced on the scope screen proportional to the value of DC voltage as detected from the output of each detector 18.

Referring to FIGURE 2 a typical bar graph display is shown as would be accomplished with the automatic-manual switch 56 in the upper or automatic position and with the mode selector switch 30 in the downward or discriminator position. A vertical bar 66A is shown on the screen proportional to the DC signal received at the output of detector 18A in the telemetry system 10. Similarly, and simultaneously, from a visual point of view, bar 66B is proportional to the output of discriminator 18B and bar 66C is proportional to the output of discriminator 18C. In the FIGURE 2 only three bars 66 are shown it being understood that with a typical telemetry system as currently used for missile and other type data transmission there would be eighteen channels in the telemetry system and therefore eighteen bars 66 shown on the face 68 of the scope. The view shown in FIGURE 2 is indicative that some defect lies in the telemetry channel 18C since the bar 66C is dissimilar from the bars shown for channel A and B.

The discriminator monitor of this invention is particularly useful in the monitoring of all systems in a missile preparatory to flight of the missile. The malfunctioning of any one of the channels of the telemetry system is immediately visually indicated. When a channel is malfunctioning the bar 66 displayed on the screen representing it may fluctuate in height or vary from height of the properly functioning channels. In the same manner, various tests can be performed to indicate cross-talk or interchannel interference immediately on the face of a scope whereas such information is exceedingly difficult to uncover when no means exist for simultaneously monitoring all channels of the telemetry system.

When the mode switch 30 is in the center or BPF (Band Pass Filter or AC) position the automatic-manual switch 56 can be used in the manual position to permit visual observation of any one of the band pass filter outputs of any of the channels as selected by channel selector switch 60.

An important use of the discriminator monitor of this invention is achieved when the mode selector switch is in the center or BPF position and when the automatic manual switch 56 is in the upper or automatic position. With these switches set as described a multiple channel AC signal display is provided on the scope face 68 providing a simultaneous time multiplexed visual display of portions of the AC signal output of each of the band pass filters 16 of the telemetery system 10.

With mode switch 30 in the center or BPF position and automatic-manual switch 56 in the automatic position the operation of the discriminator is as follows: The output of each band pass filter 16 of the telemetry receiver 10 is fed by cable 24 through attenuators 26 and amplifiers 28, through mode switch 30 to switching circuits 48 of electronic switch 46. The output of electronic switch 46 on conductor 50 is a time multiplexed set of AC signals. This multiplexed signal is fed through a vertical deflection channel portion 30E of mode switch 30 directly to the Y axis or vertical amplifier of the scope. The output of the one-shot circuit 40 is utilized through switch 30D to blank the scope during the switching between each different band pass filter signals, and to thereby provide optical, or visual isolation of the multiplexed set of AC signals.

In this BPF mode of operation the normal linear horizontal sweep scope circuits are used and the stair step signal 58 is used through switch 56A to initiate each horizontal sweep in synchronization with the electronic switch 46. In this mode of operation a portion of the AC signal output of each band pass filter 16 is displayed simultaneously across the scope face in a segmented sweep type display.

In this mode a few cycles of each sub-carrier signal is displayed on a small segment of the scope face. In one embodiment of the invention adapted for simultaneously monitoring an eighteen channel telemetry system the display time for each channel is approximately five milliseconds and the blanking time between each channel is approximately one millisecond. Provided the discriminator input amplifiers are adjusted to the same gain, the ratio of the amplitudes on the monitor unit is then the relative received amplitude ratio of the sub-carriers giving a good visual indication of the pre-emphasis ratio settings. The general quality of a few cycles of each sub-carrier gives an indication of intermodulation effects, either from spurious signals, harmonics or distortion in the transmitting link of the telemetry system.

To control the functioning of sweep circuits and blanking circuits in the scope a two channel relay 70 is provided, which in turn is controlled by mode switch 30F. In both the calibrate and detector or discriminator (DC) position of mode switch 30 relay 70 is actuated by a voltage source 72 to move relay switches 74A and 74B to the downward position. In the center or BPF (AC) position of mode switch 30 switches 74A and 74B are in the upper position. In the discriminator or DC (downward) position of mode switch 30 the normal sweep circuits of the scope are disabled and the horizontal beam motion is controlled by the stair step generator 34. In addition, in this mode the normal scope unblanking circuits are disabled and unblanking is controlled by the voltage comparator circuit 52. In the BPF mode (center position of mode switch 30) the normal linear horizontal circuits self contained in the scope are used and the stair step signal on conductor 62 is utilized through switches 56A to initiate each horizontal sweep in synchronism with electronic switch 46.

In the upper or calibrate position of mode switch 30 switch 56 may be in the automatic position for simultaneously viewing each channel to ascertain proper functioning of the circuits of the monitor and particularly of the electronic switch portion 46.

The discriminator monitor of this invention provides a system affording a visual display of the performance of a multichannel telemetry system having many unique advantages. First, by using only one multichannel electronic switch 46 the invention provides a means of viewing both the discriminator (DC) output and the BPF (AC) output of a telemetry system. Second, the system of this invention provides a means of immediate qualitative analysis of noise effect in the discriminator system for all sub-carriers of a telemetry system. By utilizing sample portions of the output of each of the band pass filters and recombining them into a segmented display the actual signal to noise quality of the entire telemetry system can be immediately and simultaneously monitored. Third, since amplitude fidelity is retained throughout the system of this invention, a rapid qualitative measure and graphic display of sub-carrier pre-emphasis is obtained. In addition to the advantages and benefits of the discriminator monitor system of this invention just enumerated, those familiar with multichannel FM/FM telemetry systems will readily ascertain and improvise new and additional applications and benefits of the invention.

Although the invention has been described with a certain degree of particularity, it is manifest that many changes may be made in the details of construction and the arrangement of components without departing from the spirit and scope of this disclosure.

What is claimed is:

1. A discriminator monitor for simultaneously monitoring on an oscilloscope having a vertical deflection input a multi-channel telemetry receiver system wherein said system consists of a multiplicity of discriminator channels, each of said channels consisting of a band pass filter section and a detector section, comprising:

a stair step generator for generating a repetitive stair step voltage signal, each signal having a step for each of said channels of said telemetry system, said generator connected to sweep a beam horizontally across the face of said oscilloscope in synchronization with said stair step signal;

a pulse generator fed by said stair step signal to provide a pulse output for each step of said stair step signal;

a tumblecounter electronic switch actuated by said pulse generator, said electronic switch having a multiplicity of isolated switching channels, said tumblecounter functioning as a sequential scanning means;

a mode selector switch having a multiplicity of channels, each of the switch channels having two inputs and one output, one of the inputs of each of said mode switch channels connected to the output of the band pass filter of one of said telemetry channels and the other input of each of said mode switch channels connected to the output of the detector portion of the same telemetry channels, the output of each channel of said mode selector switch connected to the input of a channel of said electronic switch whereby in the first or BPF position of said mode switch the output of the band pass filters of said telemetry receiver are sequentially scanned by said electronic switch and in the second or detector position of said mode switch the output of the detector portion of each of said telemetry channels are sequentially scanned by said electronic switch;

a ramp voltage generator actuated by said pulse generator sequentially generating a linearly time varying voltage signal;

a voltage comparator circuit connected, when said mode switch is in the detector position, to receive and compare the output of said electronic switch with the said time varying signal output of said ramp voltage generator, said voltage comparator circuit providing an unblanking signal by the coincidence of the time varying signal and the voltage output signal of said electronic switch, said unblanking signal fed to said oscilloscope to unblank said beam in each vertical displacement thereof, the unblanked beam providing a vertical visual bar graph of the output of one of said detectors and the scope face thereby providing a composite bar graph display of the output of all of the detectors of said telemetry system receiver when said mode switch is in the detector position; and a vertical deflection channel portion of said mode switch whereby when said mode switch is in the first or BPF position the output of said electronic switch channels are combined to form a time multiplexed signal of portions of the output of each of said band pass filters, said time multiplexed output signal connected by said vertical deflection channel portion of said mode switch to the vertical deflection input of said oscilloscope whereby as the beam of said oscilloscope moves horizontally across the face of said oscilloscope a segment of the signal output of each of said band pass filters of said telemetry system is sequentially visually displayed and whereby a composite display of the output of all of said band pass filters of said telemetry system is simultaneously displayed.

2. A monitor according to claim 1 including an individually adjustable attenuator circuit in each of the input circuits of said mode selector switch.

3. A monitor according to claim 1 including individually gain adjustable amplifier means between the output of said band pass filters and said mode selector switch.

References Cited

UNITED STATES PATENTS

| 2,485,343 | 10/1949 | Zuschlag | 340—182 |
| 2,535,043 | 12/1950 | Cook | 324—121 |
| 2,666,179 | 1/1954 | Maxwell | 340—212 |
| 2,991,419 | 7/1961 | Nilsson | 324—121 |
| 3,241,064 | 3/1966 | Bartels et al. | 324—121 |
| 3,248,650 | 4/1966 | Bialkowski et al. | 340—212 |

FOREIGN PATENTS 850,781    10/1960    Great Britain.

NEIL C. READ, *Primary Examiner.*

A. J. KASPER, *Assistant Examiner.*